L. V. LEWIS.
TESTING APPARATUS.
APPLICATION FILED MAY 21, 1910.
1,012,209.
Patented Dec. 19, 1911.
2 SHEETS—SHEET 1.
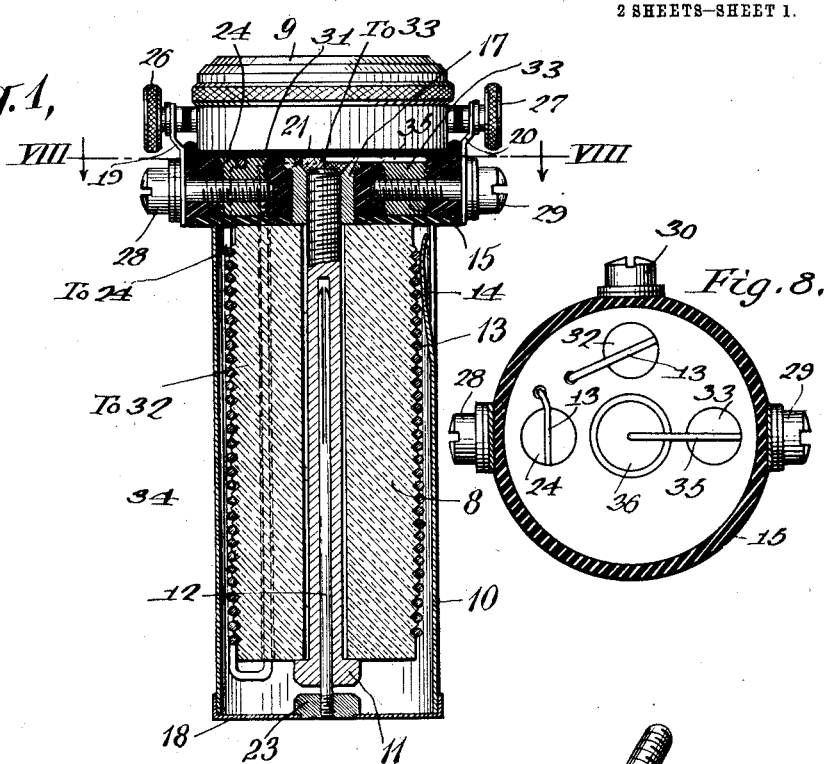
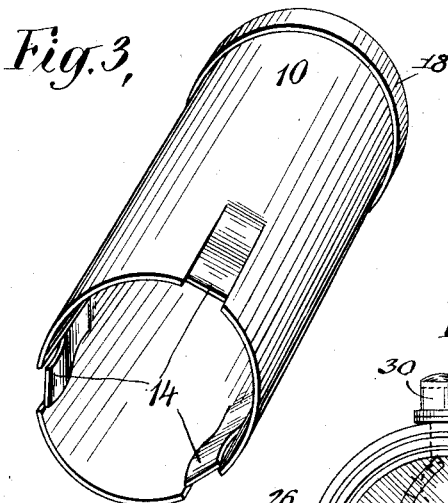
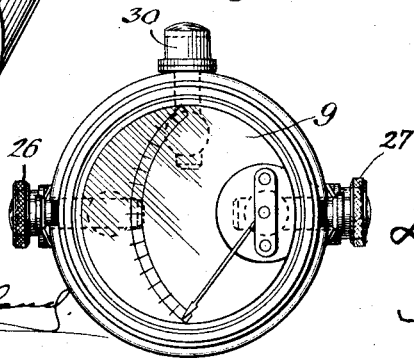
WITNESSES:
A. L. Vencill.
M. S. Kirkland.
INVENTOR
Lloyd V. Lewis
BY
His ATTORNEY L. V. LEWIS.
TESTING APPARATUS.
APPLICATION FILED MAY 21, 1910.
1,012,209.
Patented Dec. 19, 1911.
2 SHEETS—SHEET 2.
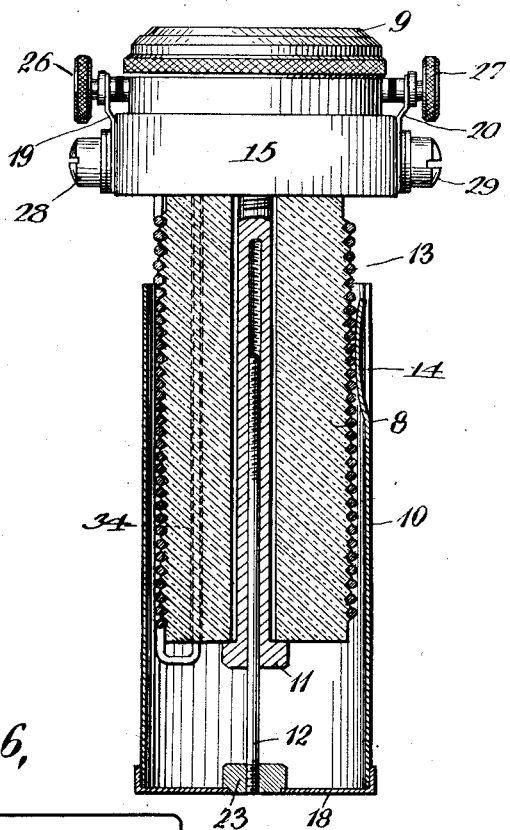
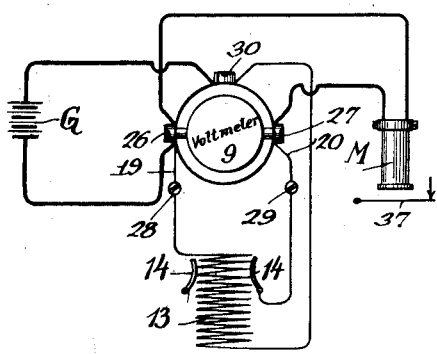
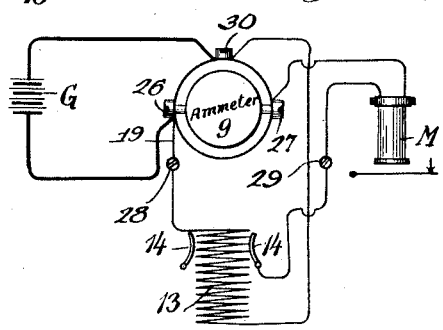
WITNESSES:
INVENTOR
Lloyd V. Lewis
BY
ATTORNEY

UNITED STATES PATENT OFFICE.

LLOYD V. LEWIS, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

TESTING APPARATUS.

1,012,209.     Specification of Letters Patent.     Patented Dec. 19, 1911.

Application filed May 21, 1910. Serial No. 562,629.

*To all whom it may concern:*

Be it known that I, LLOYD V. LEWIS, a citizen of the United States, residing in the borough of Wilkinsburg, county of Allegheny, and State of Pennsylvania, have invented certain new and useful Improvements in Testing Apparatus, of which the following is a specification.

My invention relates to testing apparatus, and particularly to that class of apparatus used to determine the operating characteristics of relays, magnets, etc. By operating characteristics, I mean for example the voltage or current at which a relay "picks up" or attracts its armature; or the voltage or current at which it releases its armature.

I will describe one form of testing apparatus embodying my invention and then point out the novel features thereof in claims.

In the accompanying drawings, Figure 1 is a view, partly in vertical section, showing one form of apparatus embodying my invention. Fig. 2 is a top plan view of the apparatus shown in Fig. 1. Figs. 3 and 4 are views showing in perspective parts of the apparatus shown in Figs. 1 and 2. Fig. 5 is a view showing a modification of the apparatus shown in Figs. 1 and 2. Fig. 6 is a diagrammatic view showing one arrangement of circuits for a testing apparatus embodying my invention. Fig. 7 is a view similar to Fig. 6 but showing a modification of the circuit arrangement shown in Fig. 6. Fig. 8 is a sectional view on the line VIII—VIII of Fig. 1, looking in the direction of the arrow.

Similar reference characters refer to similar parts throughout the several views.

A feature of my invention is the provision of a portable testing apparatus comprising an electrical measuring instrument, a coil of resistance wire, and an inclosing case for the whole, which case also serves the purpose of an adjustable slide for the resistance coil.

Referring now to Figs. 1 and 2, the reference character 9 designates an electrical measuring instrument, preferably of the "pocket" type or similar small size, and which may be a voltmeter or an ammeter, according to the purpose for which the apparatus is to be used. 26 and 27 designate the terminal posts of this instrument. This measuring instrument 9 is mounted upon a hollow spool 8 of insulating material upon which is wound a coil of resistance wire 13. The outer surface of the spool is preferably threaded as shown to facilitate the winding of the wire and to hold it in place after it has been wound. Surrounding the spool 8 is a cylindrical case 10 of electrical conducting material which makes electrical contact with the wire 13 by means of contact fingers 14 formed by lips cut in the upper end of the case. This case and the fingers are shown more clearly in Fig. 3.

Between the measuring instrument 9 and the spool 8 is a block 15 of insulating material which carries three terminal posts 28, 29, 30 (see Figs. 1, 2 and 8.) The block 15 is drilled and tapped to accommodate three terminal screws 24, 33 and 32, which screws are in turn drilled and tapped to receive the terminal posts 28, 29 and 30 respectively. The terminals of the coil 13 are connected with the terminal posts 28 and 30 by passing the ends of the wire upward through suitable holes in the block 15 and soldering the ends in slots cut in the tops of the screws 24 and 32. As shown in the drawings, the upper end of coil 13 is connected with terminal 28 by being soldered in a slot in screw 24, and the lower end passes upward through a hole 34 in the spool 8 and is connected with terminal 30 by being soldered in a slot in screw 32. The block 15 is also suitably drilled and countersunk to receive a metallic nut 17 having a collar 21 which rests on the shoulder formed by the countersink. Screwed into this nut is a bolt 11 which passes through the center of the spool 8, which bolt is shown in perspective in Fig. 4. The purposes of this bolt are, first, to rigidly secure the spool 8 and the block 15 together; and second, to electrically connect contact fingers 14 with terminal post 29 in a manner which I will now explain. Through the center of the bolt 11 is a hole 22 in which slides a pin 12, the upper end of which pin is preferably split and flared out slightly to provide for good electrical contact between the pin and the walls of the hole 22. This pin 12 is secured to the case 10 in a suitable manner; as here shown the lower end of the pin is screwed into a nut 23 which is soldered to a circular head 18, this head being suitably secured, as by soldering, to the case 10. As shown in Figs. 1 and 8, the upper face of the nut 17 may be slightly countersunk, and after the parts thus far described are assembled this countersunk hole may be filled with a suitable molten conducting material 36, such as solder. The bolt 11 is connected electrically with the terminal post 29 by means of a conductor 35 one end of which rests in the solder 36 and the other end of which is soldered in a suitable slot in the upper face of the terminal screw 33. It will be evident from the foregoing explanation that the two terminals of the coil 13 are connected with terminal posts 28 and 30 respectively, and that the contact fingers 14 which move over the coil 13 are electrically connected with terminal post 29.

The upper face of the block 15 is suitably flanged to receive the measuring instrument 9, and as here shown, this measuring instrument is secured in place by means of metallic links 19 and 20 extending respectively between terminal posts 26 and 28, and between terminal posts 27 and 29, these links serving also as electrical conductors between the said terminal posts.

25 and 31 designate washers of insulating material adapted to insulate the terminal screws 24, 32 and 33 from the coil 13 and from the measuring instrument 9 respectively.

In the modification shown in Fig. 5, the apparatus is similar to that shown in Fig. 1 except that the hole 22 in bolt 11 and the pin 12 are threaded, requiring that the case 10 be revolved in order that the contact fingers 14 may be moved over the wire 13. By means of this construction the variations of resistance obtained by the movement of the case 10 may more easily be made gradual and uniform than with the construction shown in Fig. 1.

Referring now to the diagram Fig. 6 I have here shown one method of employing a testing apparatus embodying my invention for the determination of the voltage at which a relay or magnet M " picks up " (i. e. closes) and releases its armature 37. G designates a source of current of constant voltage which is connected with the terminals of the coil 13 by means of the terminal posts 26 and 30. One terminal of the winding of relay M is connected with one terminal of the coil 13 by means of terminal post 26, and the other terminal of the relay winding is connected with the sliding contact fingers by means of terminal post 27. It will be evident therefore that the full voltage of the current from source G is impressed upon the terminals of the coil 13, but that the voltage impressed upon the winding of relay M will depend upon the point at which the contact fingers 14 engage the coil 13. That is, the voltage impressed on the relay winding is proportionate to the number of turns of the coil 13 which are included between the terminal 26 of this coil and the point at which the contact fingers 14 engage the coil. Since the terminals of the relay winding are connected directly with the terminal posts 26 and 27 of the voltmeter, this voltmeter will indicate the voltage impressed upon the relay winding. Hence the contact fingers 14 may be moved over the coil 13, by moving the inclosing case 10 as hereinbefore explained, until the armature 37 is picked up or released, and the voltages at which such operations occur may be read upon the voltmeter 9.

In Fig. 7 I show one method of employing a testing apparatus embodying my invention for the determination of current values at which a relay or magnet M performs its functions. As explained in connection with Fig. 6, the source of current G of constant voltage is connected with the terminals of coil 13 by means of terminal posts 26 and 30. The winding of relay M is included in a circuit as follows: from terminal post 26 through ammeter 9, winding of relay M, terminal post 29 to contact fingers 14. It will be evident therefore that the amount of current flowing through the relay winding M will be proportionate to the number of turns of the coil 13 which are included between the terminal 26 and the point at which the contact fingers 14 engage the coil; and since the ammeter 9 is included in the circuit of the relay winding, the current flowing in this circuit may be read at any time. Hence the contact fingers 14 may be moved over the coil 13 until the armature 37 is picked up or released, and the current values at which such operations occur may be read upon the ammeter 9. It is evident that when the testing apparatus is used in this manner, the link 20 must be either of a non-conducting material or must be omitted.

Other circuit arrangements will readily suggest themselves to one skilled in the art, according to the particular use for which the apparatus is to be adapted.

I do not wish to limit myself to the particular arrangement of parts shown and described herein, as this arrangement may be departed from without departing from the spirit and scope of my invention. For example, a resistance coil and case therefor may be constructed substantially as described herein, but without a measuring instrument mounted thereon, a portable or other type of measuring instrument being used instead. Other changes will suggest themselves to one skilled in the art.

Having thus described my invention, what I claim is:

1. A portable testing apparatus comprising a resistance coil of bare wire, an electrical measuring instrument mounted thereon, and a case for said coil adapted to slide over the coil, said case being provided with an inwardly projecting contact finger arranged to make sliding contact with the wire.

2. A portable testing apparatus comprising a spool of insulating material, an electrical measuring instrument mounted thereon, bare resistance wire wound upon said spool, and a sliding case for said spool provided with an inwardly projecting contact finger adapted to make sliding contact with the wire.

3. A portable testing apparatus, comprising a spool of insulating material, a hole through the middle thereof, an electrical measuring instrument mounted on said spool, bare resistance wire wound upon said spool, a sliding metallic case for said spool provided with an inwardly projecting contact finger adapted to make sliding contact with the wire, and a rod secured to said case and arranged to move in the hole in the spool to guide the case in its movement over the spool and to form an electrical connection to the case.

4. A portable testing apparatus comprising a spool of insulating material, a hollow metallic sleeve through the center of said spool, an electrical measuring instrument mounted on said spool, bare resistance wire wound upon the spool, a sliding metallic case for said spool provided with an inwardly projecting contact finger adapted to make sliding contact with the resistance wire, said case having a rod secured thereto adapted to move through the hollow sleeve in the spool and to make electrical contact with said sleeve.

5. A portable testing apparatus comprising a coil of resistance wire, an electrical measuring instrument mounted thereon, terminal posts mounted on said coil and adapted to connect the terminals of the coil with a source of current, and means for connecting any point of the coil with the electrical measuring instrument and with an instrument to be tested, said means comprising a sliding case for the coil having an inwardly projecting contact finger adapted to make sliding contact with the coil.

6. A portable testing apparatus comprising a coil of resistance wire, an electrical measuring instrument mounted thereon, terminal posts mounted on said coil and adapted to connect the terminals of the coil with a source of current and a sliding metallic case for the coil having an inwardly projecting contact finger adapted to make sliding contact with the coil, whereby any point of the coil may be connected with the electrical measuring instrument and with an instrument to be tested.

7. A portable testing apparatus comprising a coil of resistance wire, an electrical measuring instrument mounted thereon, terminal posts mounted on said coil and adapted to connect the terminals of the coil with a source of current, a sliding metallic case for the coil having an inwardly projecting contact finger adapted to make sliding contact with the coil, and a second sliding contact for connecting said case with the electrical measuring instrument and with an instrument to be tested.

8. A portable testing apparatus comprising a spool of insulating material, a measuring instrument secured thereto, a resistance coil arranged on the spool and having one terminal connected with the measuring instrument, a casing for said coil and spool and movable relatively thereto, and a contact carried by said casing and movable over the resistance coil.

9. A portable testing apparatus comprising a spool of insulating material, two terminal posts carried by the spool, a resistance coil wound on the spool and having its ends electrically connected respectively with the two terminal posts, a third terminal post carried by said spool, a hollow metallic sleeve extending through the spool and electrically connected with the said third terminal post, a sliding metallic casing for the spool provided with an inwardly projecting finger adapted to make sliding contact with the resistance coil and also provided with a rod electrically connected therewith and adapted to make sliding contact with the inside of the hollow sleeve, and an electrical measuring instrument mounted on the spool.

10. A portable testing apparatus comprising a spool of insulating material, two terminal posts carried by the spool, a resistance coil wound on the spool and having its ends electrically connected respectively with the two terminal posts, a third terminal post carried by said spool, a hollow metallic sleeve extending through the spool and electrically connected with the said third terminal post, a sliding metallic casing for the spool provided with an inwardly projecting finger adapted to make sliding contact with the resistance coil and also provided with a rod electrically connected therewith and adapted to make sliding contact with the inside of the hollow sleeve, an electrical measuring instrument having two terminal posts and mounted on said spool, and means for holding said instrument securely to the spool said means comprising metallic links connecting the two terminal posts of the instrument with respectively two of the terminal posts on the spool.

In testimony whereof, I have signed my name to this specification in the presence of two subscribed witnesses.

LLOYD V. LEWIS.

Witnesses:
 JOHN S. HOLLIDAY,
 S. M. LUCAS.

Copies of this patent may be obtained for five cents each, by addressing the "Commissioner of Patents, Washington, D. C."